United States Patent
Foster et al.

(10) Patent No.: US 11,196,621 B2
(45) Date of Patent: Dec. 7, 2021

(54) SUPPLEMENTAL AND ALTERNATIVE DIGITAL DATA DELIVERY AND RECEIPT MESH NET WORK REALIZED THROUGH THE PLACEMENT OF ENHANCED TRANSFORMER MOUNTED MONITORING DEVICES

(71) Applicant: Delta Energy & Communications, Inc., Murrieta, CA (US)

(72) Inventors: Scott Foster, Murrieta, CA (US); Angelo Borrelli, Fairhope, AL (US); Keith Teichmann, Newton Centre, MA (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 0 days.

(21) Appl. No.: 15/250,119

(22) Filed: Aug. 29, 2016

(65) Prior Publication Data
US 2017/0237612 A1    Aug. 17, 2017

Related U.S. Application Data

(60) Provisional application No. 62/236,420, filed on Oct. 2, 2015.

(51) Int. Cl.
*H04L 12/24* (2006.01)
*G06Q 50/06* (2012.01)
(Continued)

(52) U.S. Cl.
CPC .......... *H04L 41/0806* (2013.01); *G05B 15/02* (2013.01); *G06Q 50/06* (2013.01);
(Continued)

(58) Field of Classification Search
CPC . H04W 4/005; H04W 56/0015; H04W 72/02; H04W 48/20; H04W 4/38;
(Continued)

(56) References Cited

U.S. PATENT DOCUMENTS

| | | | |
|---|---|---|---|
| 2,704,809 A | 3/1955 | Williams | |
| 4,724,381 A | 2/1988 | Crimmins | |

(Continued)

FOREIGN PATENT DOCUMENTS

| | | |
|---|---|---|
| CN | 101860978 | 10/2010 |
| CN | 102255869 | 11/2011 |

(Continued)

OTHER PUBLICATIONS

Hafeez et al.; Smart Home Area Networks Protocols within the Smart Grid Context; Sep. 2014; Journal of Communications vol. 9, No. 9; pp. 665-671 (Year: 2014).*

(Continued)

*Primary Examiner* — Backhean Tiv
*Assistant Examiner* — Linh T. Nguyen
(74) *Attorney, Agent, or Firm* — Ware, Fressola, Maguire & Barber LLP

(57) ABSTRACT

A power grid network is provided that features a signal processor configured to:
  receive signaling containing information about digital content requested by one or more smart assets locally deployed in a smart asset infrastructure and communicatively coupled to the apparatus that is mounted in relation to a transformer configured in a grid network; and
  determine corresponding signaling containing information about the digital content requested by the one or more smart assets for providing back to a central location in the grid network for further processing, based upon the signaling received.

(Continued)

The signal processor provides the corresponding signaling back to the central location in the grid network for further processing.

31 Claims, 6 Drawing Sheets

(51) Int. Cl.
 *G05B 15/02* (2006.01)
 *H04L 29/08* (2006.01)
 *H04W 4/80* (2018.01)
 *H04W 84/12* (2009.01)
 *H04W 84/18* (2009.01)

(52) U.S. Cl.
 CPC ...... *H04L 67/12* (2013.01); *G05B 2219/2642* (2013.01); *H04W 4/80* (2018.02); *H04W 84/12* (2013.01); *H04W 84/18* (2013.01); *Y02D 30/70* (2020.08)

(58) Field of Classification Search
 CPC ........... H04W 52/0212; H04W 84/045; H04W 84/12; H04W 88/06; H04W 88/08; H04W 88/16; H04L 12/2816; H04L 12/282; H04L 12/2829; H04L 63/08; H04L 67/125; H04L 67/20; H04L 43/065; H04L 43/08; H04L 12/2809; H04L 2012/2841; H04L 41/0806; H04N 21/4223; H04N 21/4431; H04N 5/23206; H04N 21/2543; H04N 21/442; Y02D 70/00; Y02D 70/142; Y02D 70/144; Y02D 70/162; Y02D 70/22; Y02D 70/30; Y02D 30/70; H02J 13/002; H02J 13/0086; H02J 15/00; Y02B 90/241; Y02B 90/248; Y02B 90/246; Y02B 90/245; Y02B 90/244; Y02B 70/3216; Y02B 70/3208; Y02B 70/343; Y02B 90/242; Y02B 90/20; Y04S 20/32; Y04S 20/52; Y04S 20/42; Y04S 20/40; Y04S 20/30; Y04S 20/327; Y04S 40/18; Y04S 20/242; Y04S 10/30; G01R 22/063; G01R 22/06; G01D 4/004; G01D 4/002; H04Q 2209/60; H04Q 2209/25; G06Q 50/06; G06Q 40/04; G05B 15/02; G05B 2219/2642
 USPC .................. 725/25; 709/220, 238, 217, 219; 370/235, 408; 324/764.01; 700/286, 22, 700/291
 See application file for complete search history.

(56) References Cited

U.S. PATENT DOCUMENTS

| | | | |
|---|---|---|---|
| 5,426,360 A | 6/1995 | Maraio et al. |
| 5,748,104 A | 5/1998 | Argyroudis et al. |
| 5,940,009 A | 8/1999 | Loy et al. |
| 6,018,449 A | 1/2000 | Nelson et al. |
| 6,211,764 B1 | 4/2001 | Schweitzer, Jr. |
| 6,300,881 B1 | 10/2001 | Yee et al. |
| 6,549,120 B1 | 4/2003 | de Buda |
| 6,711,512 B2 | 3/2004 | Noh |
| 6,829,491 B1 | 12/2004 | Yea et al. |
| 6,856,256 B2 | 2/2005 | Winkler |
| 6,880,086 B2 | 4/2005 | Kidder et al. |
| 6,906,630 B2 | 6/2005 | Georges et al. |
| 6,998,962 B2 | 2/2006 | Cope et al. |
| 7,049,976 B2 | 5/2006 | Hunt et al. |
| 7,054,770 B2 | 5/2006 | Swarztrauber et al. |
| 7,058,524 B2 | 6/2006 | Hayes et al. |
| 7,107,329 B1 | 9/2006 | Schroder et al. |
| 7,126,558 B1 | 10/2006 | Dempski |
| 7,271,735 B2 | 9/2007 | Rogai |
| 7,304,587 B2 | 12/2007 | Boaz |
| 7,310,052 B2 | 12/2007 | Bowman |
| 7,379,981 B2 | 5/2008 | Elliott et al. |
| 7,402,993 B2 | 7/2008 | Morrison |
| 7,440,436 B2 | 10/2008 | Cheng et al. |
| 7,496,078 B2 | 2/2009 | Rahman |
| 7,733,839 B1 | 6/2010 | Frank et al. |
| 7,747,534 B2 | 6/2010 | Villicana et al. |
| 7,764,943 B2 | 7/2010 | Radtke |
| 7,894,371 B2 | 2/2011 | Bonta et al. |
| 7,936,163 B2 | 5/2011 | Lee, Jr. |
| 7,940,039 B2 | 5/2011 | de Buda |
| 7,961,740 B2 | 6/2011 | Flammer, III et al. |
| 8,054,199 B2 | 11/2011 | Addy |
| 8,060,259 B2 | 11/2011 | Budhraja et al. |
| 8,102,148 B2 | 1/2012 | Hershey et al. |
| 8,111,157 B2* | 2/2012 | Diener ................ G06Q 10/087 340/545.6 |
| 8,121,741 B2 | 2/2012 | Taft et al. |
| 8,145,732 B2 | 3/2012 | Kumar et al. |
| 8,194,275 B2 | 6/2012 | Furst et al. |
| 8,279,870 B2 | 10/2012 | Flammer, III et al. |
| 8,305,932 B2 | 11/2012 | Qiu et al. |
| 8,311,863 B1 | 11/2012 | Kemp |
| 8,370,697 B2 | 2/2013 | Veillette |
| 8,373,575 B2 | 2/2013 | Boettner et al. |
| 8,385,978 B2 | 2/2013 | Leung et al. |
| 8,401,709 B2 | 3/2013 | Cherian et al. |
| 8,412,735 B2 | 4/2013 | Yeh et al. |
| 8,423,637 B2 | 4/2013 | Vaswani et al. |
| 8,428,021 B2 | 4/2013 | Karunakaran et al. |
| 8,437,883 B2 | 5/2013 | Powell et al. |
| 8,441,372 B2 | 5/2013 | Smith et al. |
| 8,452,555 B2 | 5/2013 | Swarztrauber et al. |
| 8,509,953 B2 | 8/2013 | Taft |
| 8,543,250 B2 | 9/2013 | Seo et al. |
| 8,553,561 B1 | 10/2013 | Chokshi et al. |
| 8,566,046 B2 | 10/2013 | Deaver, Sr. |
| 8,583,520 B1 | 11/2013 | Forbes, Jr. |
| 8,600,572 B2 | 12/2013 | Sri-Jayantha |
| 8,660,868 B2 | 2/2014 | Vogel et al. |
| 8,755,303 B2 | 6/2014 | Hughes et al. |
| 8,792,626 B2 | 7/2014 | Cook et al. |
| 8,847,826 B2 | 9/2014 | Rao et al. |
| 8,855,102 B2 | 10/2014 | Borleske et al. |
| 8,862,281 B2 | 10/2014 | Yoneda et al. |
| 8,874,477 B2 | 10/2014 | Hoffberg |
| 8,880,234 B2 | 11/2014 | Sekoguchi et al. |
| 8,909,358 B2 | 12/2014 | Karnouskos |
| 8,917,716 B2 | 12/2014 | Tran |
| 8,937,497 B1 | 1/2015 | Tobin |
| 8,959,114 B2 | 2/2015 | Rehman |
| 8,963,807 B1 | 2/2015 | Lee et al. |
| 8,964,757 B2 | 2/2015 | Watson et al. |
| 8,965,590 B2 | 2/2015 | Boardman et al. |
| 8,970,394 B2 | 3/2015 | Veillette |
| 9,002,670 B2 | 4/2015 | Hurri et al. |
| 9,013,173 B2 | 4/2015 | Veillette |
| 9,014,996 B2 | 4/2015 | Kamel et al. |
| 9,031,116 B2 | 5/2015 | Young et al. |
| 9,041,349 B2 | 5/2015 | Bemmel et al. |
| 9,043,174 B2 | 5/2015 | Arya et al. |
| 9,052,216 B2 | 6/2015 | Kamel et al. |
| 9,087,451 B1 | 7/2015 | Jarrell |
| 9,110,101 B2 | 8/2015 | Pietrowicz et al. |
| 9,112,381 B2 | 8/2015 | Carralero et al. |
| 9,118,219 B2 | 8/2015 | Booth |
| 9,129,355 B1 | 9/2015 | Harvey et al. |
| 9,141,653 B2 | 9/2015 | Zhou et al. |
| 9,144,082 B2 | 9/2015 | Rubin et al. |
| 9,162,753 B1 | 10/2015 | Panto et al. |
| 9,400,192 B1 | 7/2016 | Salser, Jr. et al. |
| 9,400,867 B2 | 7/2016 | Boyd et al. |
| 9,402,292 B1 | 7/2016 | Gordin et al. |
| 9,451,060 B1 | 9/2016 | Bowers et al. |
| 9,500,716 B2 | 11/2016 | Turner et al. |
| 9,654,173 B2 | 5/2017 | Barzegar et al. |

(56) References Cited

U.S. PATENT DOCUMENTS

| | | |
|---|---|---|
| 9,961,572 B2 | 5/2018 | Foster et al. |
| 10,055,869 B2 | 8/2018 | Borrelli et al. |
| 10,055,966 B2 | 8/2018 | Foster et al. |
| 2001/0038342 A1 | 11/2001 | Foote |
| 2002/0046368 A1 | 4/2002 | Friedrich et al. |
| 2002/0064010 A1 | 5/2002 | Nelson et al. |
| 2002/0106018 A1* | 8/2002 | D'Luna ............. H04N 21/4381 375/240.01 |
| 2003/0050737 A1 | 3/2003 | Osann, Jr. |
| 2003/0078996 A1 | 4/2003 | Baldwin |
| 2003/0128149 A1 | 7/2003 | Miceli et al. |
| 2004/0057491 A1 | 3/2004 | Stenestam |
| 2004/0082203 A1 | 4/2004 | Logvinov et al. |
| 2005/0078624 A1 | 4/2005 | Shu et al. |
| 2005/0088299 A1 | 4/2005 | Bandy et al. |
| 2006/0007016 A1 | 1/2006 | Borkowski et al. |
| 2006/0056363 A1 | 3/2006 | Ratiu et al. |
| 2006/0141940 A1 | 6/2006 | Bloom et al. |
| 2006/0145834 A1 | 7/2006 | Berkman et al. |
| 2007/0043849 A1 | 2/2007 | Lill et al. |
| 2007/0048702 A1 | 3/2007 | Jang et al. |
| 2007/0088630 A1 | 4/2007 | MacLeod et al. |
| 2007/0229295 A1 | 10/2007 | Curt et al. |
| 2008/0065342 A1 | 3/2008 | Zalitzky et al. |
| 2008/0100436 A1 | 5/2008 | Banting et al. |
| 2008/0106425 A1 | 5/2008 | Deaver et al. |
| 2008/0109387 A1 | 5/2008 | Deaver et al. |
| 2008/0272934 A1 | 11/2008 | Wang et al. |
| 2008/0317047 A1 | 12/2008 | Zeng et al. |
| 2009/0003662 A1 | 1/2009 | Joseph et al. |
| 2009/0088907 A1 | 4/2009 | Lewis et al. |
| 2009/0102680 A1 | 4/2009 | Roos |
| 2009/0111456 A1 | 4/2009 | Shaffer et al. |
| 2009/0119068 A1 | 5/2009 | Banting |
| 2009/0135836 A1* | 5/2009 | Veillette ................. H04L 45/04 370/400 |
| 2009/0146839 A1 | 6/2009 | Reddy et al. |
| 2009/0167558 A1 | 7/2009 | Borleske et al. |
| 2009/0187284 A1 | 7/2009 | Kreiss et al. |
| 2009/0240449 A1 | 9/2009 | Gibala et al. |
| 2009/0256686 A1 | 10/2009 | Abbot et al. |
| 2009/0267792 A1 | 10/2009 | Crichlow |
| 2009/0312881 A1 | 12/2009 | Venturini Cheim et al. |
| 2010/0026517 A1* | 2/2010 | Cumeralto ............... H04Q 9/00 340/870.03 |
| 2010/0074176 A1 | 3/2010 | Flammer, III et al. |
| 2010/0278187 A1* | 11/2010 | Hart ....................... H04L 45/00 370/401 |
| 2010/0313146 A1 | 12/2010 | Nielsen et al. |
| 2011/0026500 A1 | 2/2011 | Shaffer et al. |
| 2011/0047230 A1 | 2/2011 | McGee |
| 2011/0066297 A1 | 3/2011 | Saberi et al. |
| 2011/0090833 A1 | 4/2011 | Kneckt et al. |
| 2011/0095867 A1 | 4/2011 | Ahmad |
| 2011/0208367 A1 | 8/2011 | Sackman et al. |
| 2011/0255417 A1 | 10/2011 | Mohan et al. |
| 2012/0007885 A1 | 1/2012 | Huston |
| 2012/0029897 A1 | 2/2012 | Cherian et al. |
| 2012/0050971 A1 | 3/2012 | Seal et al. |
| 2012/0058790 A1 | 3/2012 | Junnell et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0106394 A1 | 5/2012 | Apostolakis |
| 2012/0126790 A1* | 5/2012 | Sobotka ................. G01D 4/002 324/119 |
| 2012/0126994 A1 | 5/2012 | Sobotka et al. |
| 2012/0131324 A1 | 5/2012 | Ansari et al. |
| 2012/0229089 A1 | 9/2012 | Bemmel et al. |
| 2012/0229296 A1 | 9/2012 | Ree |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0286770 A1 | 11/2012 | Schroder et al. |
| 2012/0297481 A1* | 11/2012 | Boot ..................... G06F 21/554 726/23 |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0103660 A1* | 4/2013 | Welsh ................. H04L 12/2812 707/705 |
| 2013/0106617 A1 | 5/2013 | Heo et al. |
| 2013/0110837 A1 | 5/2013 | Dai et al. |
| 2013/0123998 A1 | 5/2013 | King et al. |
| 2013/0190939 A1 | 7/2013 | Lenox |
| 2013/0203378 A1 | 8/2013 | Vos et al. |
| 2013/0218495 A1 | 8/2013 | Boone et al. |
| 2013/0222215 A1 | 8/2013 | Kobayashi |
| 2013/0223334 A1 | 8/2013 | Guo et al. |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2013/0315057 A1* | 11/2013 | Popa ........................ H04L 12/24 370/228 |
| 2013/0335062 A1* | 12/2013 | de Buda ................. G01R 21/00 324/142 |
| 2014/0067330 A1 | 3/2014 | Flammer, III |
| 2014/0092765 A1 | 4/2014 | Agarwal et al. |
| 2014/0098685 A1 | 4/2014 | Shattil |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0189722 A1* | 7/2014 | Shetty ................ H04N 21/6582 725/14 |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0259108 A1* | 9/2014 | Clark ....................... H04L 63/08 726/3 |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Silverman |
| 2014/0300210 A1 | 10/2014 | Abi-Ackel et al. |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0358315 A1 | 12/2014 | Liu et al. |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1* | 12/2014 | Boross ..................... H04L 12/28 370/389 |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |

(56) References Cited

U.S. PATENT DOCUMENTS

| | | | |
|---|---|---|---|
| 2015/0094968 A1 | 4/2015 | Jia et al. | |
| 2015/0095936 A1* | 4/2015 | Yu | H04N 21/6125 |
| | | | 725/28 |
| 2015/0112469 A1 | 4/2015 | Da Silva Neto et al. | |
| 2015/0121470 A1 | 4/2015 | Rongo et al. | |
| 2015/0127601 A1 | 5/2015 | McGill et al. | |
| 2015/0142963 A1 | 5/2015 | Choi et al. | |
| 2015/0148979 A1 | 5/2015 | Forbes, Jr. | |
| 2015/0149396 A1 | 5/2015 | Arya et al. | |
| 2015/0155713 A1 | 6/2015 | Forbes, Jr. | |
| 2015/0163849 A1 | 6/2015 | Bauer et al. | |
| 2015/0179062 A1 | 6/2015 | Ralston et al. | |
| 2015/0200713 A1* | 7/2015 | Hui | H04B 3/544 |
| | | | 370/254 |
| 2015/0200846 A1 | 7/2015 | Hui et al. | |
| 2015/0220762 A1 | 8/2015 | Jiang et al. | |
| 2015/0249595 A1 | 9/2015 | Geiger | |
| 2015/0256433 A1 | 9/2015 | Sum et al. | |
| 2015/0256435 A1* | 9/2015 | Sum | G01R 25/00 |
| | | | 702/62 |
| 2015/0276433 A1 | 10/2015 | Brahmajosyula et al. | |
| 2015/0281996 A1 | 10/2015 | Rubin et al. | |
| 2015/0288532 A1 | 10/2015 | Veyseh et al. | |
| 2015/0288825 A1* | 10/2015 | Cook | H04M 7/0069 |
| | | | 379/220.01 |
| 2015/0294557 A1 | 10/2015 | Willig et al. | |
| 2015/0311951 A1* | 10/2015 | Hariz | H04B 3/54 |
| | | | 375/257 |
| 2015/0370615 A1* | 12/2015 | Pi-Sunyer | G05B 15/02 |
| | | | 700/276 |
| 2015/0373521 A1 | 12/2015 | Olesen et al. | |
| 2015/0373641 A1 | 12/2015 | Yamana et al. | |
| 2016/0029384 A1 | 1/2016 | Sidhu et al. | |
| 2016/0081127 A1* | 3/2016 | Lee | H04W 76/10 |
| | | | 709/228 |
| 2016/0094402 A1* | 3/2016 | Finkelstein | H04L 41/0803 |
| | | | 709/226 |
| 2016/0094879 A1* | 3/2016 | Gerszberg | H04N 21/64322 |
| | | | 725/71 |
| 2016/0134932 A1* | 5/2016 | Karp | H04N 21/4431 |
| | | | 348/155 |
| 2016/0198245 A1* | 7/2016 | Rhoads | G08C 19/12 |
| | | | 340/870.02 |
| 2016/0205106 A1* | 7/2016 | Yacoub et al. | H04L 29/06 |
| | | | 726/28 |
| 2016/0214715 A1 | 7/2016 | Meffert | |
| 2016/0261425 A1* | 9/2016 | Horton | G05B 15/02 |
| 2016/0292205 A1 | 10/2016 | Massey et al. | |
| 2016/0327603 A1 | 11/2016 | Sonderegger et al. | |
| 2016/0337354 A1* | 11/2016 | Smadja | H04W 12/0609 |
| 2016/0360361 A1* | 12/2016 | Ross | H04W 4/02 |
| 2016/0366461 A1* | 12/2016 | Hu | H04N 21/472 |
| 2017/0003142 A1 | 1/2017 | Allcorn et al. | |
| 2017/0048598 A1 | 2/2017 | Foster et al. | |
| 2017/0108236 A1 | 4/2017 | Guan et al. | |
| 2017/0134092 A1 | 5/2017 | Foster et al. | |
| 2017/0223807 A1* | 8/2017 | Recker | H05B 37/0272 |
| 2017/0302511 A1 | 10/2017 | Foster et al. | |
| 2017/0339536 A1 | 11/2017 | Lewis et al. | |
| 2018/0132015 A1 | 5/2018 | Borrelli et al. | |
| 2018/0267494 A1 | 9/2018 | Meranda et al. | |
| 2018/0366978 A1 | 12/2018 | Matan et al. | |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| KR | 20130108769 A | 10/2013 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Monnier; A SmarterGrid with the Internet of Things; Oct. 2013; Texas Instruments; pp. 1-11 (Year: 2013).*

Spinsante et al. NFC-Based User Interface for Smart Environments; Feb. 24, 2015; Hindawi Publishing Corporation; Advances in Human-Computer Interaction; pp. 1-12 (Year: 2015).*

Modoff et al. Industry The Internet of Things; May 6, 2014; Deutsche Bank Markets Research; pp. 1-102 (Year: 2014).*

Tuohy; What is home automation and how do I get started; Jan. 26, 2015; Network World; pp. 1-9 (Year: 2015).*

U.S. Appl. No. 16/372,911, filed Apr. 2, 2019, "Data Transfer Facilitation to and Across A Distributed Mesh Network Using A Hybrid TV White Space, Wi-Fi and Advanced Metering Infrastructure Construct" (43 pages).

Amin, R. et al., "Roadmap to Smart Grid Technology: A Review of Smart Information and Communication System," International Journal of Control and Automation, vol. 7, No. 8, 2014, pp. 407-418.

Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.

Oin, Z., "A Survey of Networking Issues in Smart Grid," www.cse.wustl.edu/~jain/cse570-13/ftp/smrtgrid/index.html, Dec. 20, 2013 (12 pages).

Parag Kulkarni, et al., "A Mesh-Radio-Based Solution for Smart Metering Networks", IEEE Communications Magazine, Jul. 2012, 10 pages.

International Search Report and Written Opinion, International Application No. PCT/US2017/46991, dated Nov. 21, 2017 (8 pages).

Metz, Cade, "Facebook's Massive New Antennas Can Beam Internet for Miles," https://www.wired.com/2016/04/facebooks-massive-new-antennas-can-beam-internet-miles/, Apr. 13, 2016.

(56) References Cited

OTHER PUBLICATIONS

Choubey, Neeraj, et al., "Introducing Facebook's new terrestrial connectivity systems—Terragraph and Project ARIES—Facembook Engineering," https://engineering.fb.com/connectivity/introducing-facebook-s-new-errestrial-connectivity-systems-terragraph-and-project-aries/, Apr. 13, 2016.
Snyder, A.F., et al., "The ANSI C12 protocol suite—updated and now with network capabilities", Mar. 2007 (available at http://horizontec.com/sccsmartgrid. 2yt4/2007-03ClemsonPSC02-snyder-mtgstuber.pdf) (6 pages).
International Search Report and Written Opinion dated Jan. 23, 2017 in international patent application No. PCT/US2016/049245 (16 pages).
GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.
Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer, "Bundling, Differentiation, Alliances and Mergers: Convergence Strategies in U.S Communication Markets," Communications & Strategies, No. 60, Dec. 2005, online at http://mpra.ub.uni-muenchen.de/2515/, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009,4 pages.
Smart Grid Northwest, "Qualitrol," http://smartgridnw.org/membership/member-organizations/qualitrol/, accessed Oct. 13, 2015, 3 pages.
Detlef Zuehlke, "SmartFactory—Towards a factory-of-things" Annual Reviews in Control, 34.1, Mar. 28, 2010, pp. 129-138.
Artem Katasonov, et al., "Smart Semantic Middleware for the Internet of Things", Jan. 2008, 11 pages.
Andrea Zanella, et al., "Internet of Things for Smart Cities." IEEE Internet of Things Journal, vol. 1, Iss. 1, Feb. 2014, pp. 22-32.
Dieter Uckelmann, et al., "An Architectural Approach Towards the Future Internet of Things." Architecting The Internet of Things, Springer-Verlag Berlin Heidelberg, 2011, pp. 1-24.
Ning Zhong, et al., "Research challenges and perspectives on Wisdom Web of Things (W2T)." The Journal of Supercomputing, Nov. 26, 2010, 21 pages.
Lockheed Martin, "Self-Powered Ad-hoc Network", http://www.lockheedmartin.com/us/products/span.html, accessed Nov. 9, 2015.
Owada, et al., "Design for Disaster-Tolerant and Dependable Network Architecture," ICMU 2012, pp. 136-141, Information Processing Society of Japan, 2012.
Morganthaler, et al., "UAVNet: A Mobile Wireless Mesh Network Using Unmanned Aerial Vehicles," available at http://rvs.unibe.ch/research/pub_files/MBZSA12.pdf, 2012.
Snow, "Why Drones Are the Future of the Internet of Things", Dec. 1, 2014, available at https://www.suasnews.com/2014/12/why-drones-are-the-future-of-the-internet-of-things/.
St. John, Jeff, "How Utilities Could Use Virtual Reality and Google Glass to Monitor the Grid," Mar. 3, 2015, 6 pages.
InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvlVhBd.
Monnier, Olivier, "A Smarter Grid With the Internet of Things," Texas Instruments, Oct. 2013, 11 pages.
Güngör, V. et al., "Smart Grid Technologies: Communication Technologies and Standards," IEEE Transactions on Industrial Informatics, vol. 7, No. 4, Nov. 2011, pp. 529-539.
Güngör, V. et al., "A Survey on Communication Networks for Electric System Automation," Feb. 2006, available at: https://smartech.gatech.edu/bitstream/handle/1853/27879/electric_system_automation.pdf.
Zaballos, A. et al., "Heterogeneous Communication Architecture for the Smart Grid," IEEE Network, vol. 25, No. 5, Sep./Oct. 2011, pp. 30-37, available at http://www.itk.ntnu.no/fag/TTK4545/TTK2/Pensum-filer/SmartGrid.pdf.
Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.
Parikh, P. et al., "Opportunities and Challenges of Wireless Communication Technologies for Smart Grid Applications," 2010, available at http://citeseerx.ist.psu.edu/viewdoc/download?doi=10.1.1.453.7100&rep=rep1&type=pdf.
International Search Report and Written Opinion dated Oct. 28, 2016 issued in international patent application No. PCT/US2016/045233 (10 pages).
International Search Report and Written Opinion dated Dec. 9, 2016 in international patent application No. PCT/US2016/046509 (13 pages).
International Search Report and Written Opinion dated Dec. 19, 2016 in international patent application No. PCT/US16/50393 (11 pages).
International Search Report and Written Opinion dated May 26, 2017 in counterpart international patent application No. PCT/US2017/019434 (10 pages).
International Search Report and Written Opinion dated Jan. 19, 2017 in international patent application No. PCT/US2016/058407 (16 pages).
International Search Report and Written Opinion dated Jan. 25, 2017 in international patent application No. PCT/US2016/058383 (13 pages).
Jiang, R. et al., "Energy-theft detection issues for advanced metering infrastructure in smart grid," IEEE, Tsinghua Science and Technology, vol. 19, Issue 2, Apr. 15, 2014 (16 pages).
Blumsack, S. et al., Abstract of "Ready or not, here comes the smart grid!" Energy, vol. 37, Issue 1, Jan. 2012 (pp. 61-68).
McLaughlin, S. et al., "Energy theft in the advanced metering infrastructure," Abstract, Critical Information Infrastructures Security, Sep. 30, 2009 (pp. 176-187).
Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).
Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).
Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.
Nasipuri, A. et al., "Demo Abstract: Wireless Sensor Network for Substation Monitoring: Design and Deployment," ResearchGate Conference Paper, Jan. 2008 (3 pages).

\* cited by examiner

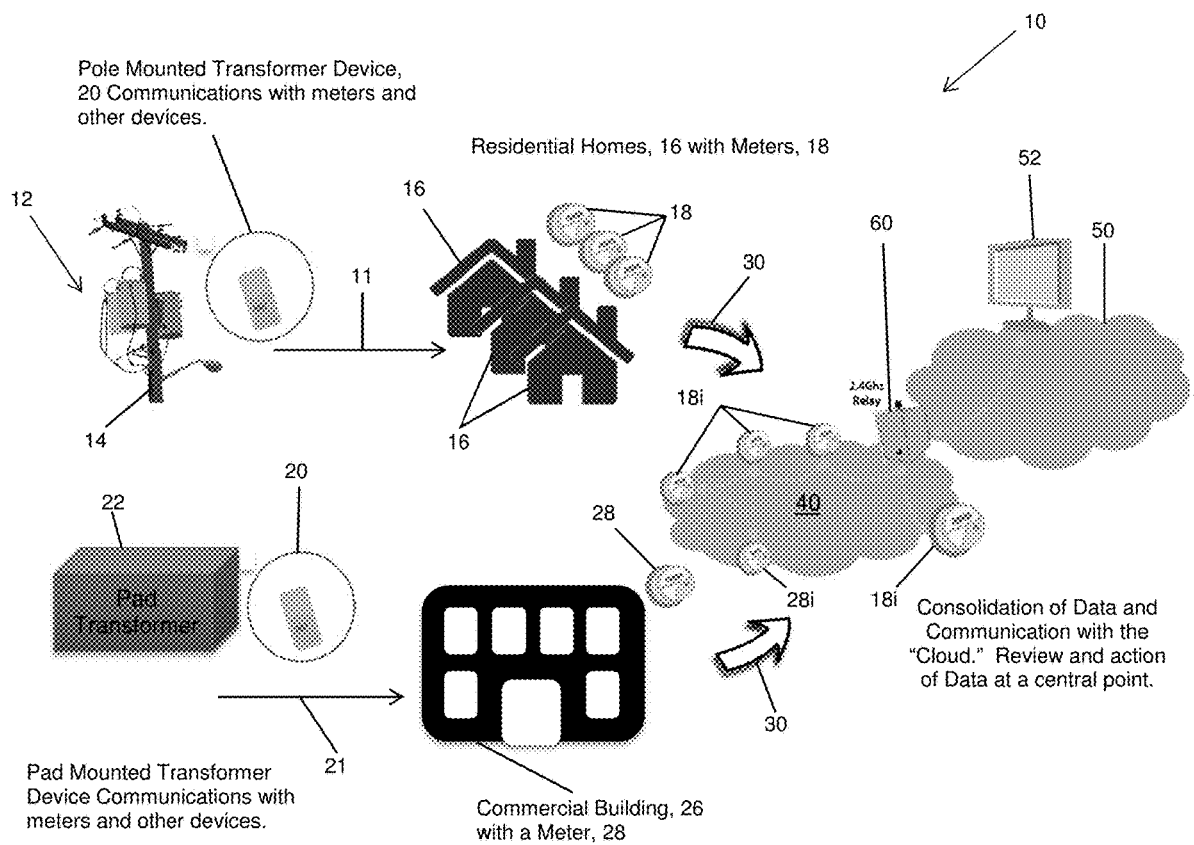
Figure 1A: Example of Network having Residential and Commercial Structures with Transformer Monitor / Data Collector Device

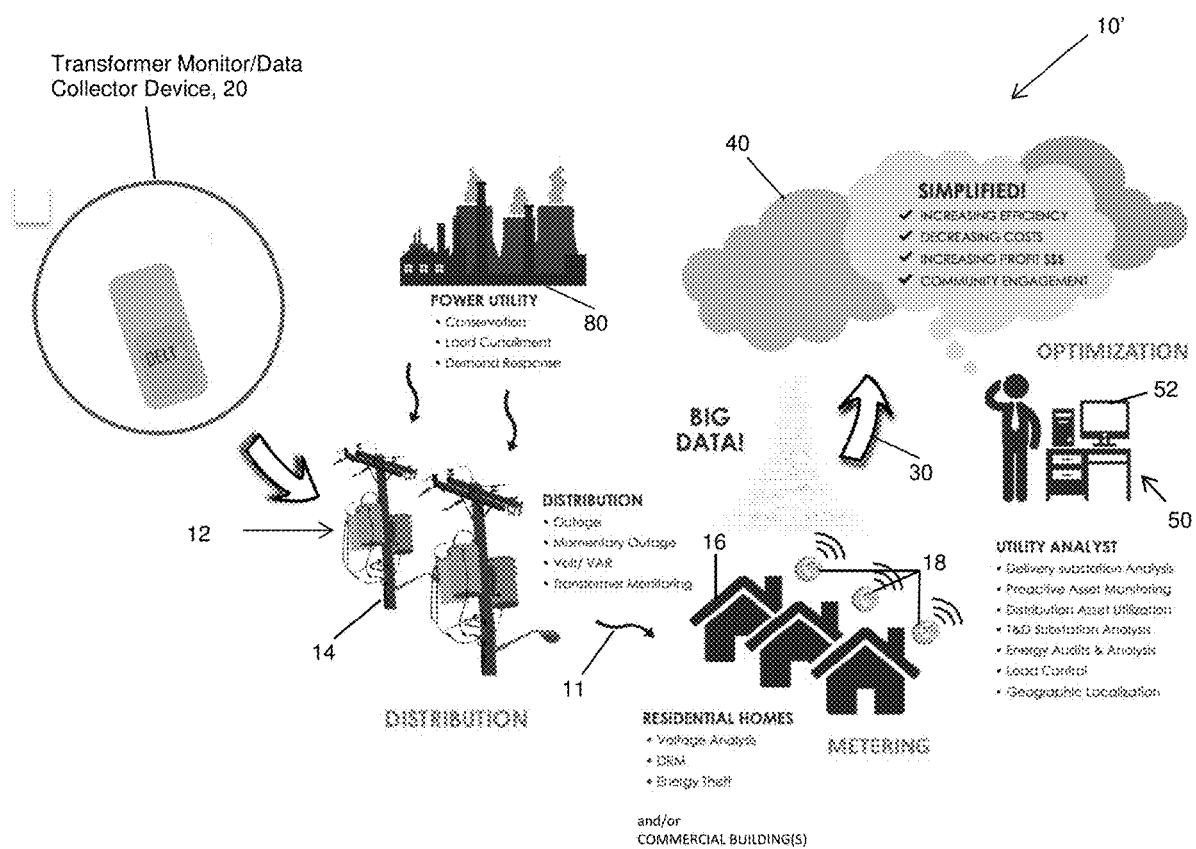
Figure 1B: Example of Network having Residential and Commercial Structures with Transformer Monitor / Data Collector Device

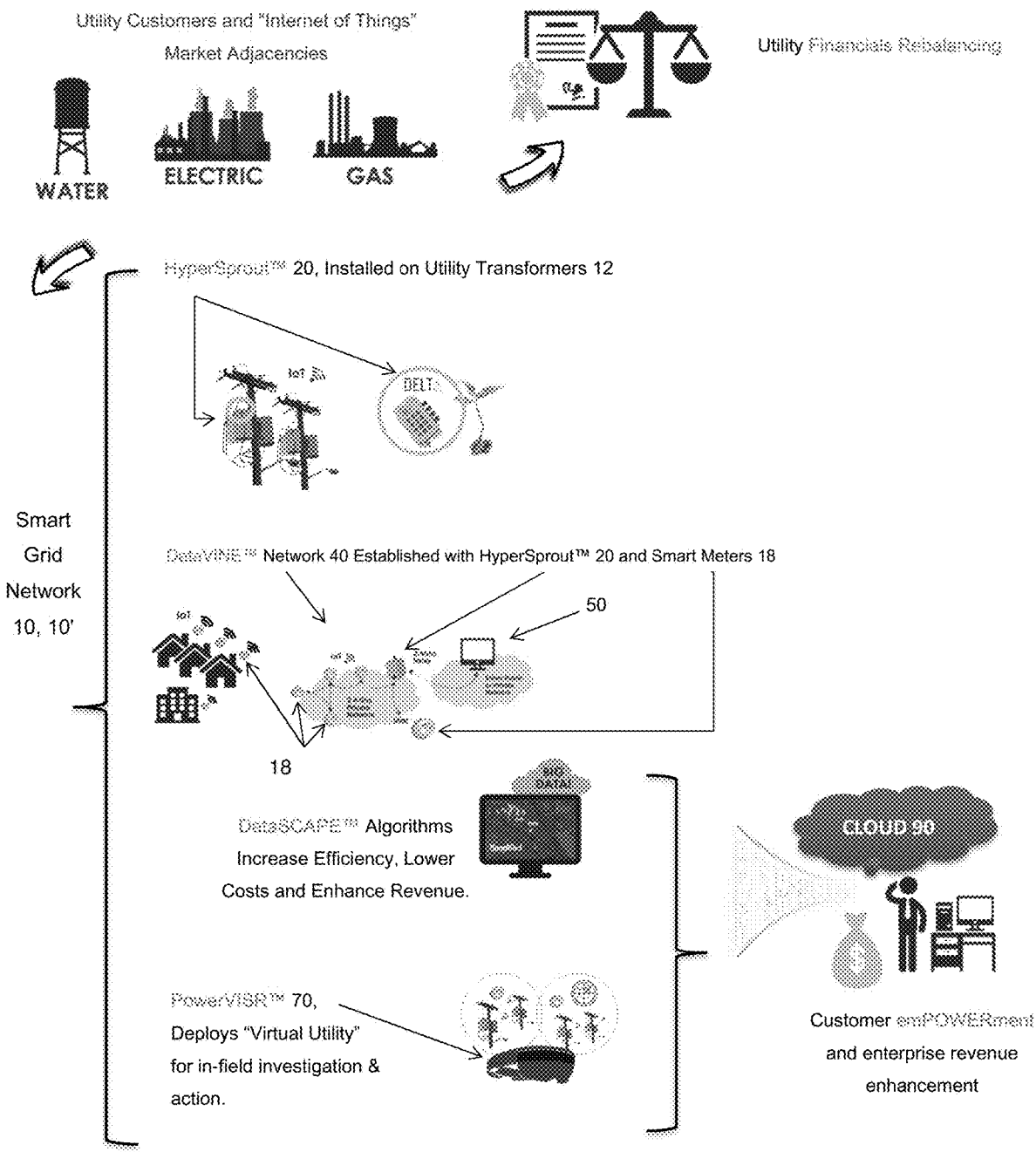
Figure 2 – Establishment of Baseline, Power Grid Centric, Smart Utility Mesh Network

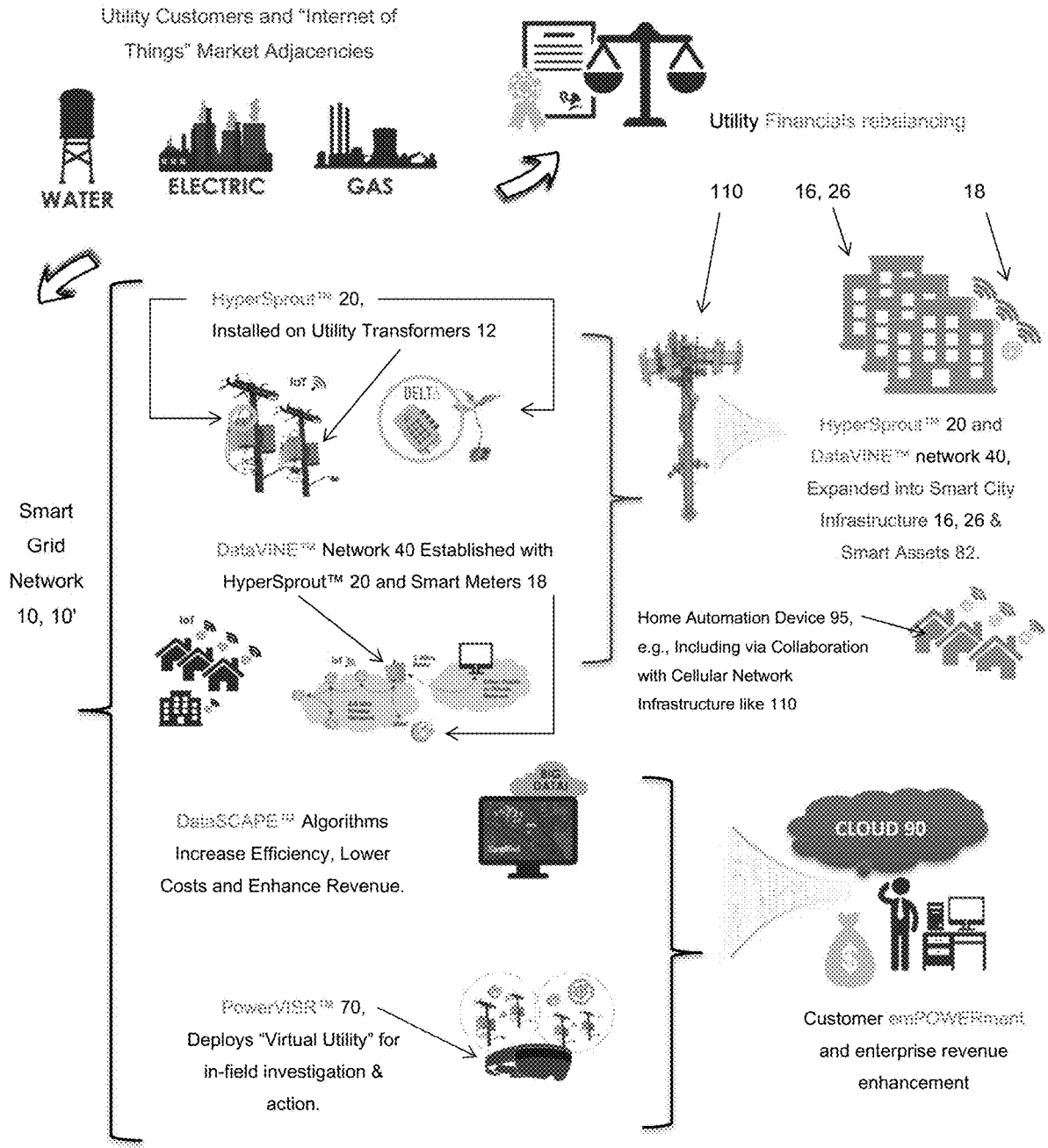

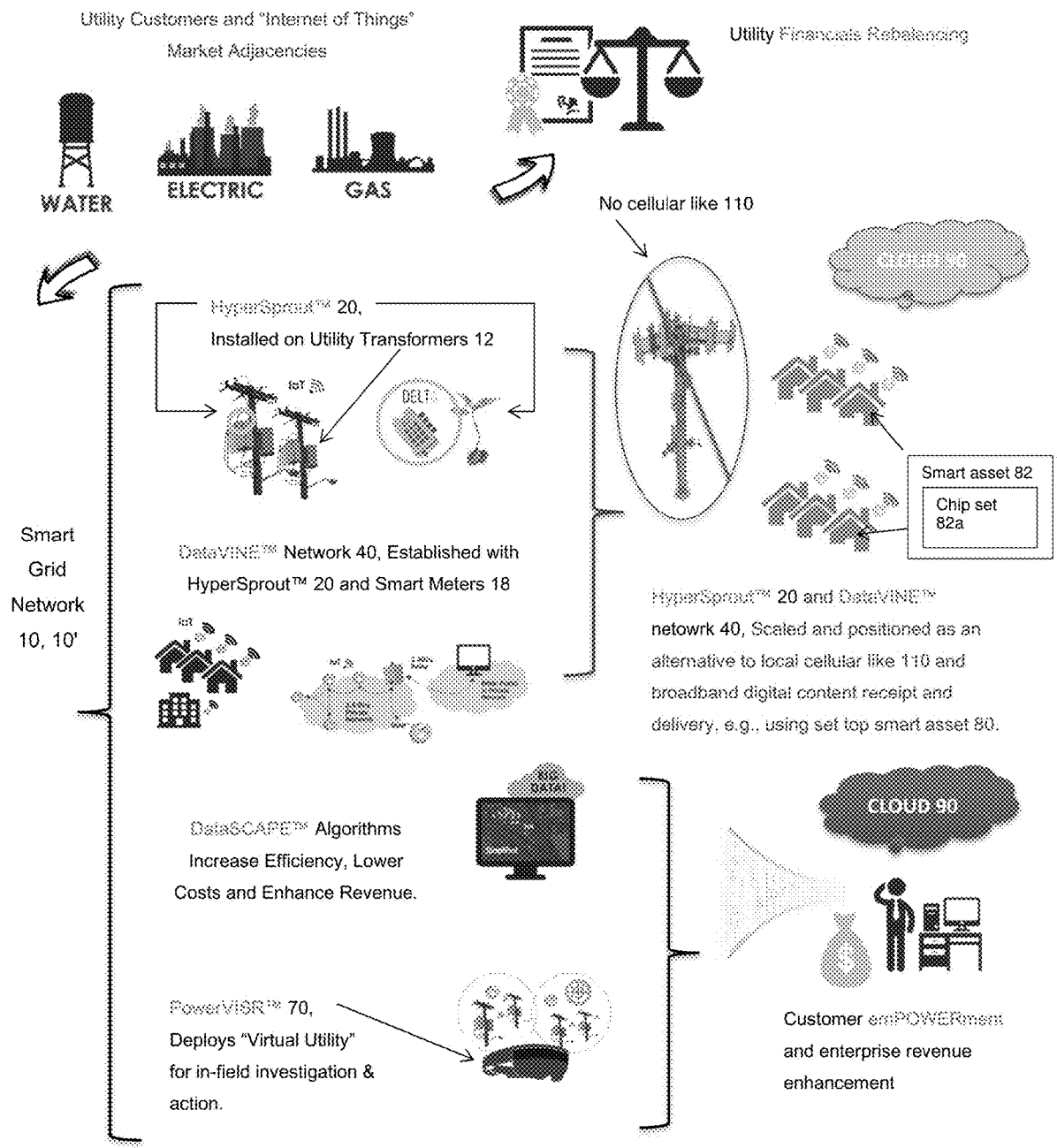
Figure 4 – Scaling into Full-Service Digital Content Receipt & Delivery Network Apparatus 100, e.g. including a smart grid network 10, 10' having a communication node, or including a transformer module 20 having a communication node, with Signal processor or processing module 102 configured at least to:

receive signaling containing information about digital content requested by one or more smart assets locally deployed in a smart asset infrastructure and communicatively coupled to the apparatus that is mounted in relation to a transformer configured in a grid network;

determine corresponding signaling containing information about the digital content requested by the one or more smart assets for providing back to a central location in the grid network for further processing, based upon the signaling received; and/or provide the corresponding signaling back to the central location in the grid network for further processing.

Other signal processor circuits or components 104 that do not form part of the underlying invention, e.g., including input/output modules, one or more memory modules, data, address and control busing architecture, etc.

Figure 5: The Basic Signal Processing Functionality

SUPPLEMENTAL AND ALTERNATIVE DIGITAL DATA DELIVERY AND RECEIPT MESH NET WORK REALIZED THROUGH THE PLACEMENT OF ENHANCED TRANSFORMER MOUNTED MONITORING DEVICES

CROSS REFERENCE TO RELATED APPLICATION

This application claims benefit to U.S. provisional application No. 62/236,420, filed 2 Oct. 2015, which is hereby incorporated by reference in its entirety.

The present invention forms part of, and builds on, the family of technologies disclosed in the other related applications identified below.

BACKGROUND OF THE INVENTION

1. Field of the Invention

The present invention relates to a technique for implementing a power grid network; and more particularly, the present invention relates to a method and apparatus for implementing a smart power grid network for provisioning digital content via a mesh network.

2. Brief Description of Related Art

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

With this IoT understanding and backdrop, currently there is a need within global smart grid networks, e.g., in urban and remote locations with limited electric infrastructure, for communications with transformers, residential and commercial meters and other Internet/wireless connected devices {commonly referred to as the "Internet of Things"}. These targeted locations do not have sufficient infrastructure to fully deploy a smart grid or Internet infrastructure.

SUMMARY OF THE INVENTION

By way of example, and according to some embodiments, the present invention may include, or take the form of, apparatus, such as a communication node, featuring a signal processor or signal processing module, configured to:

receive signaling containing information about digital content requested by one or more smart assets locally deployed in a smart asset infrastructure and communicatively coupled to the apparatus that is mounted in relation to a transformer configured in a grid network; and determine corresponding signaling containing information about the digital content requested by the one or more smart assets for providing back to a central location in the grid network for further processing, based upon the signaling received.

According to some embodiments, the present invention may include one or more of the following features:

Further Signal Processing Functionality

The signal processor may be configured to provide the corresponding signaling back to the central location in the grid network for further processing.

The signal processor may be configured to
receive associated signaling containing information about the digital content requested back from the central location in the grid network; and
determine digital content signaling containing information about the digital content requested for providing to the one or more smart assets, based upon the associated signaling received.

The signal processor may be configured to provide the digital content signaling to the one or more smart assets.

Smart Asset Functionality

The smart asset infrastructure may include a residential home or commercial structure; and the one or more smart assets may include a residential home or commercial structure automation device, a smart communications device, and/or a digital set-top box arranged in relation to the residential home or commercial structure.

The signal processor may be configured to:
receive the signaling from the one or more smart assets via wireless signaling; or provide the corresponding signaling to the central location via wireless signaling; or both receive the signaling and provide the corresponding signaling.

The one or more smart assets may include a communications chip set configured to communicate with the apparatus in the grid network, including allowing for both the capture and communications of digital information both to and from the one or more smart assets and a communication node having the signal processor.

The apparatus may include the one or more smart assets.

The one or more smart assets may include a communications chip set having a corresponding signal processor configured to communicate with the apparatus in the grid network.

The corresponding signal processor may be configured to provide the signaling containing information about the digital content requested.

The corresponding signal processor may be configured to: receive user-generated signaling containing information about the digital content requested by a user; and determine the signaling for providing to the apparatus, based upon the user-generated signaling received.

The corresponding signal processor may be configured to: receive the digital content signaling containing information about the digital content requested by a set-top box user; and determine set-top box signaling to play the digital content for the set-top box user.

The corresponding signal processor may be configured to: receive the digital content signaling containing information about the digital content requested by a user of a residential home or commercial structure automation device; and determine automation signaling to adapt the residential home or commercial structure automation device so as to automate the residential home or commercial structure for the user.

The one or more smart assets may include a smart communications device, including a smart phone, a smart tablet, a laptop computer, a desktop computer, a person digital assistant (PDA) device, a smart wearable device.

Grid Network Functionality

The grid network may be configured to communicate using a wireless communications protocol, including a wireless local area network (WLAN), a wireless personal area network (WPAN), a wireless wide area network (WWAN).

The wireless communications protocol may be, or may take the form of, IEEE 802.11.

The apparatus may include the grid network.

Other Features/Functionality

The signaling may contain information about other wireless network signaling received from, or provided by, a back-end cellular network.

The apparatus may include a transformer monitor, communication and data collection device configured with the signal processor.

The apparatus may include a smart grid mesh network having a transformer monitor, communication and data collection device configured with the signal processor.

The smart grid mesh network may include a cloud network configured to exchange cloud network signaling with a communications node in the smart grid mesh network.

The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

Other Home Automation Functionality

The residential home or commercial structure automation device may be configured to exchange cellular signaling with a back-end cellular network, including where the back-end cellular network does not form part of the grid network.

Power Grid Network

The apparatus may include a power grid network configured to provide electrical power to one or more buildings or structures in the grid network.

The power grid network may include a smart grid mesh network with a transformer monitor, communication and data collection device configured with the signal processor.

The Transformer Monitor, Communication and Data Collection Device

The signal processor may also be configured to:
receive signaling containing information about collected data, including some combination of electrical signaling data related to electrical signaling being processed by the transformer located and arranged in the grid network and to which the apparatus is mounted in relation to, metered data related to associated electrical signaling being provided from the transformer to the one or more smart assets in the smart asset infrastructure in the grid network, and other wireless network data related to other wireless network communication devices/nodes deployed in the grid network; and
determine corresponding signaling containing information about the collected data for transmitting back to the central location or other connection device for further processing, based upon the signaling received.

The other wireless network data includes the digital content request received from the one or more smart assets.

The digital content may include an exchange of information amongst various interconnected or non-interconnected devices that form part of the grid network.

The digital content may contain information about applications and/or processes related to industry, energy, transportation, healthcare, consumer products, social media, entertainment, transportation, banking, on-line commerce, industrial automation, or gaming.

The Central Location

The central location may include a server that forms part of an Internet service provider network.

The grid network may include at least part of the central location.

The instant application provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1A is a diagram of a smart power grid network having a transformer monitor/data collection device, according to some embodiments of the present invention.

FIG. 1B is a diagram of a smart power grid network having a transformer monitor/data collection device, according to some embodiments of the present invention.

FIG. 2 is a diagram showing an establishment of a baseline, power grid centric, smart utility mesh network, according to some embodiments of the present invention.

FIG. 3 is a diagram showing an expansion of the baseline mesh network into smart city infrastructure and home automation, according to some embodiments of the present invention.

FIG. 4 is a diagram showing a scaling into a full-service digital content receipt and delivery network, according to some embodiments of the present invention.

FIG. 5 is a block diagram of apparatus, e.g., that may include a smart grid network or a transformer module having a communication node with a signal processor or processing module, configured for implementing signal processing functionality associated with the present invention, according to some embodiments of the present invention.

In the drawing, not every element in every Figure has a reference label to reduce clutter in the drawing.

DETAILED DESCRIPTION OF THE INVENTION

FIGS. 1A and 1B

By way of example, FIGS. 1A and 1B show examples of smart power grid networks generally indicated as 10, 10', according to some embodiments of the present invention. By way of example, the smart power grid network 10. 10' may take the form of, or may be configured to include, one or more digital data and delivery and receipt mesh networks like element 40. Each digital data and delivery and receipt mesh network 40 may include one or more communication nodes such as the transformer module or device 20 for exchanging information upstream and downstream between the communication nodes and a central location, e.g., which takes the form of the private network 50 in FIGS. 1A and 1B. The one or more communication nodes may be configured to be able exchange such upstream and downstream information between themselves in order to exchange such upstream and downstream information between a respective communication node and the central location like element 50. In FIGS. 1A and 1B, similar elements are provided with similar reference labels.

In FIGS. 1A and 1B, the smart power grid network 10, 10' may include transformers like element 12 for providing electric energy to residential homes and commercial buildings like elements 16, 26, each having a respective electrical meter like elements 18, 28 for measuring the associated electrical energy usage. The smart power grid network 10, 10' may also include transformer monitor/data collection devices 20 (aka "Hypersprout™") configured to collect data about the electrical energy usage in relation to residential homes and commercial buildings 16, 26 from the respective electrical meter like element 18, 28. For example, each electrical meter 18, 28 may provide metered data signaling containing information about metered data related to associated electrical signaling being supplied from the transformer 12 to the building or structure 16, 26 in the grid network 10, 10'. Moreover, transformer monitor/data collection devices 20 may receive associated signaling containing information about electrical signaling data related to electricity being processed by the transformer 12 located and arranged in the grid network and to which the transformer monitoring device is mounted, as well as other wireless network data related to other communication nodes forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes in the grid network, e.g., which may include digital content as set forth in further detail below.

The transformer monitor/data collection devices 20 may also configured to provide suitable signaling 30 containing information about the collected data to the private network 50 via the digital data and delivery and receipt mesh network 40. The private network 50 may be configured as a central point that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network.

The pole mounted transformer device 20 may be configured in communications with the electrical meter 18 associated with the residential home 16 (FIG. 1B). By way of example, the electrical meter 18 may be configured to measure single phase electrical energy provided by the transformer 12 along a single phase utility line 11 to the residential home 16.

In comparison, the pole mounted transformer device 20 may also include, or take the form of, a pad mounted transformer device 20 (FIG. 1A) in communications with an electrical meter 28 associated with a commercial building home generally indicated as 26 (see also FIG. 3). By way of example, the electrical meter 28 may be configured to measure three (3) phase electrical energy provided by a pad transformer along a three (3) phase utility line to the commercial building home 26. In FIG. 1B, a power utility 80 may be configured to provide the electrical energy in the smart grid network 10'.

FIG. 1B shows that the transformer device 20 may be configured to collect data related to some distribution related functionality, e.g., including determinations related to outage, momentary outage, voltage/VAR, and/or transformer monitoring. FIG. 1B shows that the transformer device 20 may be configured to collect data related to some voltage analysis, DRM functionality and energy theft functionality in relation to its associated residential home or commercial building. The transformer device 20 can provide the suitable signaling 30 containing information about the collected data to the private network 50 via the digital data and delivery and receipt mesh network 40. The collected data received by the private network 50 may also be analyzed in relation to conservation, load curtailment and/or a demand response vis-a-vis the power utility 80. In FIG. 1B, the private network 50 may include a private network computer and monitor generally indicated as 52 for performing or implementing the aforementioned analysis and functionality.

FIG. 1A shows that the digital data and delivery and receipt mesh network 40 may include other transformer devices like element 20 exchanging information with other meters like elements 18$i$, 28$i$ associated with other buildings or structures like elements 16, 26.

FIG. 1A also shows a relay 60 coupled between the digital data and delivery and receipt mesh network 40 and the private network 50. By way of example, the relay 60 is shown as 2.4 GHz relay for communicating with a corresponding 2.4 GHZ private network 50, although the scope of the invention is not intended to be limited to any particular frequency and/or wireless or wired transmission media for the relay or network.

FIGS. 2-4: The Basic Invention

The overall smart power grid network 10 according to the present invention represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices {commonly referred to as the "Internet of Things"}. The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt and delivery.

The smart grid network 10 according to the present invention represents a singular, standardized, and scalable network, providing the industry's first inclusive solution from a singular supplier. The smart grid network 10 is inclusive of four basic technology elements. The primary hardware and software constituents of the network are as noted and identified below.

1. The pole or pad mounted transformer monitor/smart data collector device is identified herein as element 20, according to the present invention (AKA as "HyperSprout™"), which is the localized data aggregation and power flow investigation; establishing a data capture and delivery capability wherever there is power, e.g., consistent with that set forth herein.
2. A digital data and delivery and receipt mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in U.S. application Ser. No. 62/236,420.
3. A smart node power grid communication protocol (AKA "DataSCAPE™"), which provides for a comprehensive nodal exchange analysis of all grid parameters; realizing an inclusive geo-spatial understanding of utility operations, e.g., consistent with that set forth in U.S. provisional application Ser. Nos. 62/205,358 and 62/375,170.
4. An enhanced reality field investigation, interaction and servicing; deploying the industry's first "virtual" utility (AKA as "PowerVISR™"), e.g., consistent with that set forth in U.S. patent application Ser. No. 15/234,293.

Taken collectively, this energy and communications portfolio and financial strategy improves over current offerings through its intimate understanding of utility partners' pain points, core needs and anticipated delights. Most importantly, the network hardware and software solution allows for the identification of the purposeful diversion of energy {i.e., theft} and the focused remediation of the offending areas or subjects, subsequently enhancing enterprise revenues.

In application, a business model may be coupled with an innovative Smart Grid Financing strategy. This strategy benefits appropriate customers with a novel financing capability, realized via line loss remediation activities inherent in the DSGN™ deployment, e.g., consistent with that disclosed in U.S. provisional patent Ser. No. 62/213,815.

Establishment of Baseline, Power Grid Centric,
Smart Utility Mesh Network {BtB}

The present invention represents a new and unique inclusion of wireless communications and data transmission capability into transformer monitoring modules like element 20, transformer monitoring being a core component within a so-called smart grid network like element 10. These transformer modules 20 may be mounted directly to utility transformers 12 in the field and include the capability to both collect and transmit information from the transformer 12, residential and commercial meters like element 18 and other Internet/wireless connected devices in the network 10. The transformer module or device 20 according to the present invention differs from other existing technology by incorporating a transceiver, transmitter and antenna collectively within the same device to both collect data from other network devices, including other transformer modules 20 or smart assets like element 82, deployed in the field and communicate collected data back to a central location like element 50 or other connected devices like other elements 20.

The aforementioned overall combination provides an infinitely scalable data delivery and receipt capability for communities with poorly established, historical infrastructure while providing a synergistic network capability to those communities with current or anticipated cellular, satellite or other capability.

These transformer modules like element 20 are disclosed in U.S. patent Ser. No. 15/160,754, filed 20 May 2016, which claims benefit to provisional patent application Ser. No. 62/203,101, filed 10 Aug. 2015, entitled "Transformer mounted monitor, communications and data collection device."

Expansion of Baseline Mesh Network into Smart
City Infrastructure and Home Automation {BtB and
BtC}

Once established, the smart grid network implementation and the associated transformer module and mesh network hardware and software assets may be easily expanded to allow for integration with both Smart City Infrastructure 16, 26 and Home Automation smart devices 95, e.g., consistent with that set forth below in relation to FIGS. 3-4. For example, inclusion of a smart grid network communications chip set like element 82a for implementing smart grid network communications chip set signal processing functionality into locally deployed smart assets like element 82 allows for both the capture and communications of digital information both to and from these smart asset devices like element 82. By way of example, these smart asset devices like element 82 may include, or take the form of, set top boxes having the smart grid network communications chip set contained therein, e.g., for communicating with a transformer module like element 20, or for communication with the so-called cloud 90. In areas of established infrastructure, this capability allows for the localized capture and communications with smart devices 82 within the geographical confines of the mesh network smart network like element 10. In areas where coordination is required outside of this localized network, a back-end cellular capability may be utilized, like the backend cellular functionality associated with a back end cellular tower like element 110. In peri-urban and rural areas of extremely poor infrastructure and cellular service, the smart grid network deployed system provides a competitive and less costly alternative to dedicated cellular infrastructure and may be paired with various wireless transmissions medias including cellular, satellite, optical or other wireless transmissions media either now known or later developed in the future.

By way of further example, the integration with, or replacement of, local wireless network delivery systems allows the seamless integration with current home automation technology, allowing for the direct communication with these devices using the smart grid network deployed system.

Scaling into Full-Service Digital Content Receipt &
Delivery Network {BtC}

Scaling of the deployed transformer modules or devices with ongoing optimization of the defined mesh network allows for establishing a lucrative alternative pathway for digital content receipt and delivery to networked consumers. Recognizing the proliferation of Digital Set-Top boxes like element 82 from the leading consumer technology innovators, inclusion of the smart grid network chip set within these devices provides an alternative capability for digital content beyond that currently offered by cellular and broadband suppliers.

This solution according to the present invention may be used to enhance the assignee's utility partner's enterprise operations through the synergistic implementation of the smart grid network and the balance sheet refinancing model disclosed in provisional patent application Ser. No. 62/213,815, while deploying a unique, alternative network for BtB/BtC data receipt and delivery.

The three summaries below and their associated figures define the construct around these operational models.
1. Establishment of Baseline, Power Grid Centric, Smart Utility Mesh Network (FIGS. 1A, 1B and 2)
2. Expansion of Baseline Mesh Network into Smart City Infrastructure & Home Automation (FIG. 3)
3. Scaling into Full-Service Digital Content Receipt & Delivery Network (FIG. 4)

FIG. 5: Implementation of Signal Processing Functionality

By way of example, FIG. 5 shows apparatus generally indicated as 100 according to some embodiments of the present invention, e.g., featuring a signal processor or processing module 102 configured at least to:
receive signaling containing information about digital content requested by one or more smart assets locally deployed in a smart asset infrastructure and communicatively coupled to the apparatus that is mounted in relation to a transformer configured in a grid network; and
determine corresponding signaling containing information about the digital content requested by the one or more smart assets for providing back to a central location in the grid network for further processing, based upon the signaling received.

According to some embodiments, the apparatus 100 may take the form of the smart grid network 10 having a communication node with the signal processor or signal processing module 102 for implementing the signal processing functionality. Alternatively, according to some embodiments, the apparatus 100 may take the form the transformer module 20 having a communication node with the signal processor or processing module 102 for implementing the signal processing functionality. In effect, the transformer module 20 itself may take the form of the communication node.

In operation, the signal processor or processing module 102 may be configured to provide the corresponding signaling back to the central location in the grid network for further processing.

By way of example, the functionality of the apparatus 100 may be implemented using hardware, software, firmware, or a combination thereof. In a typical software implementation, the apparatus 100 may include one or more microprocessor-based architectures, e.g., having the at least one signal processor or microprocessor like element 102. A person skilled in the art would be able to program with suitable program code such a microcontroller-based, or microprocessor-based, implementation to perform the functionality described herein without undue experimentation.

Moreover, and by way of further example, the signal processor or processing module 102 may be configured, e.g., by a person skilled in the art without undue experimentation, to receive the signaling containing information about digital content requested by one or more smart assets locally deployed in a smart asset infrastructure and communicatively coupled to the apparatus that is mounted in relation to a transformer configured in a grid network, consistent with that disclosed herein.

Moreover still, and by way of still further example, the signal processor or processing module 102 may be configured, e.g., by a person skilled in the art without undue experimentation, to determine the corresponding signaling containing information about the digital content requested by the one or more smart assets for providing back to a central location in the grid network for further processing, based upon the signaling received, consistent with that disclosed herein.

The scope of the invention is not intended to be limited to any particular implementation using technology either now known or later developed in the future. The scope of the invention is intended to include implementing the functionality of the processors 102 as stand-alone processor, signal processor, or signal processor module, as well as separate processor or processor modules, as well as some combination thereof.

The apparatus 100 may also include, e.g., other signal processor circuits or components 104, including random access memory or memory module (RAM) and/or read only memory (ROM), input/output devices and control, and data and address buses connecting the same, and/or at least one input processor and at least one output processor, e.g., which would be appreciate by a person skilled in the art.

Digital Content

By way of example, digital content with respect to this patent application may include, or encompass, the exchange of information amongst various interconnected or non-interconnected devices, e.g., transformer modules, transformer modules and set top boxes, transformer modules and the central location and/or private network, transformer modules and smart communications devices, etc. By way of further example, this digital content may cross multiple markets including, but not limited to, industrial, energy, transportation, healthcare, information, consumer, logistics, and similar. Further, this digital content may be uni-directional or bi-directional in nature, providing closed loop feedback or open loop communication. The digital content may comprise time-based data streams, historical data transition, finite and immediate data exchanges, or other forms of communications, to name a few. This digital content may be transitioned via RF communications, optical networking communications or other wireless or wired transmission media. For purposes of this patent application, the substance of the transmitted information remains inclusive of all parameters and data streams defined by the products noted herein.

Furthermore, the digital content may include digital content that is now known, as well as digital content that may be developed in the future. In other words, the scope of the invention is not intended to be limited to the type or kind of digital content, both now known and later developed in the future.

Other Related Applications

The application is related to other patent applications, some of which are identified above, that together form part of the overall family of technologies developed by one or more of the inventors herein, and disclosed in the following applications:
U.S. patent application Ser. No. 15/160,754, filed 20 May 2016, entitled "Transformer mounted monitor, communications and data collection device," which claims benefit to U.S. provisional application No. 62/203,101, filed 10 Aug. 2015, having a similar title;

U.S. patent application Ser. No. 15/234,293, filed 11 Aug. 2016, entitled "Enhanced reality system for visualizing, evaluating, diagnosing, optimizing and servicing smart grids and incorporated components," which claims benefit to U.S. provisional application Ser. No. 62/203,719, filed 11 Aug. 2015, having a similar title;

U.S. provisional application Ser. No. 62/375,170, filed 15 Aug. 2016, entitled "Integrated solution of Internet of Things, DSGN™, and iDAP™ pertaining to Communication, Data and Asset Serialization, and Delta Data Modeling Algorithms," and related U.S. provisional application Ser. No. 62/205,358, filed 14 Aug. 2015, having the same title;

U.S. provisional application Ser. No. 62/213,815, filed 3 Sep. 2015, entitled "Novel application of line loss revenues for smart grid purchase and installation financing using proprietary analytics systems and hardware;"

U.S. provisional application Ser. No. 62/244,914, filed 22 Oct. 2015, entitled "Augmentation, expansion and self-healing of a geographically distributed mesh network using unmanned aerial vehicle (UAV) technology;"

U.S. provisional application Ser. No. 62/244,919, filed 22 Oct. 2015, entitled "Data transfer facilitation across a distributed mesh network using light and optical based technology;" and

[7] U.S. provisional application Ser. No. 62/299,348, filed 24 Feb. 2016, entitled "Distributed 802.11s mesh network using hypersprout hardware for the capture and transmission of data;" which are all assigned to the assignee of the instant patent application, and which are all incorporated by reference in their entirety.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein may not be not drawn to scale in whole or in part.

Although the invention has been described and illustrated with respect to exemplary embodiments thereof, the foregoing and various other additions and omissions may be made therein and thereto without departing from the spirit and scope of the present invention.

What we claim is:

1. An apparatus comprising:
   a communication node comprising a signal processing module configured to:
   monitor a transformer configured to distribute electric energy to a plurality of buildings in a grid;
   communicate wirelessly with a plurality of electric meters associated with the plurality of buildings via a first, wireless utility mesh network, of which the apparatus is a part, comprising the apparatus and the plurality of electric meters, wherein the apparatus receives metering data from the plurality of electric meters via the wireless utility mesh network;
   receive a request for digital content by a communications device coupled to the apparatus in a second wireless digital content delivery mesh network, of which the apparatus is also a part;
   determine corresponding signaling containing information about the digital content requested by the communications device and transmit said corresponding signaling containing information about the digital content requested to a central location for further processing, based upon the request received;
   receive signaling containing information about collected data, including some combination of electrical signaling data related to electrical signaling being processed by the transformer located and arranged in the wireless utility mesh network and to which the apparatus is mounted, the metering data, and other wireless network data related to other wireless network communication devices or nodes deployed in the wireless utility mesh network; and
   determine corresponding signaling containing information about the collected data and transmit said corresponding signaling containing information about the collected data to the central location to perform one or more utility analyses, at least in part based on the collected data.

2. The apparatus according to claim 1, wherein the signal processing module is further configured to provide the corresponding signaling containing information about the digital content requested back to the central location for further processing.

3. The apparatus according to claim 2, wherein the signal processing module is further configured to
   receive associated signaling containing information about the digital content requested back from the central location; and
   determine digital content signaling containing information about the digital content requested for providing to the communications device, based upon the associated signaling received.

4. The apparatus according to claim 3, wherein the signal processing module is further configured to provide the digital content signaling to the communications device.

5. The apparatus according to claim 1, wherein
   the communications device includes one or more of a residential home or commercial structure wireless router, a digital set-top box.

6. The apparatus according to claim 2, wherein the signal processing module is further configured to:
   provide the corresponding signaling containing information about the digital content requested to the central location via wireless signaling; and
   provide the corresponding signaling containing information about the collected data to the central location via wireless signaling.

7. The apparatus according to claim 1, wherein the communications device comprises a communications chip set configured to communicate with the apparatus, including allowing for both capture and communications of digital information both to and from a plurality of smart assets and a communication node having the signal processing module.

8. The apparatus according to claim 1, wherein the wireless digital content delivery mesh network is an expansion of the wireless utility mesh network and the wireless digital content delivery mesh network further comprises the plurality of electric meters.

9. The apparatus according to claim 4, wherein the communications device comprises a communications chip set having a corresponding signal processing module configured to communicate with the apparatus.

10. The apparatus according to claim 9, wherein the corresponding signal processing module is further configured to provide the request containing information about the digital content requested.

11. The apparatus according to claim 10, wherein the corresponding signal processing module is further configured to receive user-generated signaling containing information about the digital content requested by a user, and determine the signaling for providing to the apparatus, based upon the user-generated signaling received.

12. The apparatus according to claim 9, wherein the corresponding signal processing module is further configured to
receive the digital content signaling containing information about the digital content requested by a set-top box user; and
determine set-top box signaling to play the digital content for the set-top box user.

13. The apparatus according to claim 9, wherein the corresponding signal processing module is further configured to
receive the digital content signaling containing information about the digital content requested by a user of a residential home or commercial structure automation device; and
determine automation signaling to adapt the residential home or commercial structure automation device so as to automate the residential home or commercial structure for the user.

14. The apparatus according to claim 1, wherein the wireless utility mesh network and the wireless digital content delivery mesh network are configured to communicate using a wireless communications protocol, including a wireless local area network (WLAN), a wireless personal area network (WPAN), a wireless wide area network (WWAN).

15. The apparatus according to claim 14, wherein the wireless communications protocols are, or take the form of, IEEE 802.11.

16. The apparatus according to claim 1, wherein the corresponding signaling contains information about other wireless network signaling received from, or provided by, one or more of a back-end cellular network, optical network, fiber optic network, satellite network, or another network.

17. The apparatus according to claim 1, wherein the digital content includes one or more of movies, songs, photographs, advertising media, social media exchanges, internet searching requests, internet searching downloads, digital imagery, web page renderings, streaming media, on-line gaming, voice over internet, video over internet, and email communications.

18. The apparatus according to claim 5, wherein the residential home or commercial structure automation device is configured to exchange cellular signaling with one or more of a back-end cellular network, optical network, fiber optic network, satellite network or another network.

19. The apparatus according to claim 1, wherein the other wireless network data includes the digital content request received from the communications device.

20. The apparatus according to claim 1, wherein the digital content includes an exchange of information amongst various interconnected or non-interconnected devices that form part of the wireless digital content delivery mesh network.

21. The apparatus according to claim 19, wherein the digital content contains information about applications and/or processes related to industry, energy, transportation, healthcare, consumer products, social media, entertainment, transportation, banking, on-line commerce, industrial automation, or gaming.

22. The apparatus according to claim 1, wherein the central location comprises a server that forms part of an Internet service provider network.

23. The apparatus according to claim 1, wherein the communications device includes one or more of a smart phone, a smart tablet, a laptop computer, a desktop computer, a personal digital assistant (PDA) device, a smart wearable device.

24. The apparatus according to claim 1, wherein the signal processing module comprises a transceiver, transmitter and antenna configured to communicate with the plurality of electric meters, the communications device and the central location, and a signal processor.

25. The apparatus according to claim 1, wherein the one or more utility analyses comprise one or more of conservation analyses, load curtailment, a delivery subtraction analysis, utility asset monitoring, distribution asset utilization, energy audits, load control and geographic localization.

26. A system comprising:
an apparatus configured to monitor performance of a transformer configured to distribute electric energy to a plurality of buildings in a grid;
a plurality of electric meters associated with the plurality of buildings configured to monitor electricity usage at the plurality of buildings;
a plurality of communications devices configured to request and receive digital content;
a wireless utility mesh network comprising the apparatus and the plurality of electric meters configured to exchange information about electricity usage in the grid;
a wireless digital content delivery mesh network comprising the apparatus and the plurality of communications devices, wherein the plurality of communications devices are configured to transmit requests for digital content to the apparatus and the apparatus is configured to transmit digital content to the plurality of communications devices through the wireless digital content delivery mesh network; and
a central location;
wherein the apparatus is further configured to:
determine corresponding signaling containing information about the digital content requested by one of the plurality of communications devices and transmit said corresponding signaling containing information about the digital content requested to the central location for further processing, based upon the request received;
receive signaling containing information about collected data, including some combination of electrical signaling data related to electrical signaling being processed by the transformer located and arranged in the wireless utility mesh network and to which the apparatus is mounted, the metering data, and other wireless network data related to other wireless network communication devices or nodes deployed in the wireless utility mesh network; and
determine corresponding signaling containing information about the collected data and transmit said corresponding signaling containing information about the collected data to the central location to perform one or more utility analyses, at least in part based on the collected data.

27. The system of claim 26, wherein the wireless digital content delivery mesh network is an expansion of the wireless utility mesh network and the wireless digital content delivery mesh network further comprises the plurality of electric meters.

28. The system of claim 26, wherein the wireless utility mesh network and the wireless digital content delivery mesh network are configured to communicate using the IEEE 802.11 wireless communications protocols.

29. The system of claim 26, wherein the plurality of communications devices comprises at least one digital set-top box.

30. The system of claim 26, wherein the requested and received digital content includes one or more of movies, songs, photographs, advertising media, social media exchanges, internet searching requests, internet searching downloads, digital imagery, web page renderings, streaming media, on-line gaming, voice over internet, video over internet, and email communications.

31. The system of claim 27, wherein the wireless digital content delivery mesh network comprises the plurality of electric meters and the plurality of communications devices as communication nodes in the wireless digital content delivery mesh network which are configured to exchange signaling received from the apparatus between themselves in the wireless digital content delivery mesh network and configured to exchange signaling directed towards the apparatus between themselves in the wireless digital content delivery mesh network.

* * * * *